UNITED STATES PATENT OFFICE.

SAMUEL HENRY ELLIS AND THOMAS HOLT, OF STOKE-UPON-TRENT, ENGLAND.

DIPPING CERAMIC GLASS, &c.

SPECIFICATION forming part of Letters Patent No. 714,104, dated November 18, 1902.

Original application filed October 22, 1900, Serial No. 33,903. Divided and this application filed February 25, 1901. Serial No. 48,853. (No specimens.)

*To all whom it may concern:*

Be it known that we, SAMUEL HENRY ELLIS, of 13 Lichfield street, Hanley, and THOMAS HOLT, of Ebeneezer House, Quarry avenue, Stoke-upon-Trent, in the county of Stafford, England, subjects of the King of Great Britain and Ireland, have invented certain new and useful Improvements in or Connected with Dipping Ceramic Glass and Like Ware, (for which we have made application for patent in Great Britain on March 23, 1900;) and we do hereby declare the following to be a full, clear, and exact description of the invention, such as will enable others skilled in the art to which it appertains to make and use the same.

This invention for improvements in or connected with dipping ceramic glass and like ware has for its object to obviate the hand operations in dipping ceramic glass and like ware in glaze and consequent risk of lead poisoning, while the output of dipped ware is considerably increased; and it consists in a new process of dipping ware that can be carried out by machinery instead of by hand. Now according to this process the ware is first revolved or otherwise inserted into the glaze, the ware is then rotated in the glaze, and finally the ware is revolved or otherwise withdrawn out of the glaze. When out of the glaze, it may be rotated to throw off superfluous glaze.

What we claim, and desire to secure by Letters Patent, is—

The process for dipping ware consisting in revolving the ware into glaze, then rotating the ware in the glaze and finally revolving it back out of the glaze.

In testimony whereof we have affixed our signatures in presence of two witnesses.

SAMUEL HENRY ELLIS.
  THOMAS HOLT.

Witnesses:
 F. BARRATT,
 JOHN H. COPESTAKE.